UNITED STATES PATENT OFFICE 2,516,348

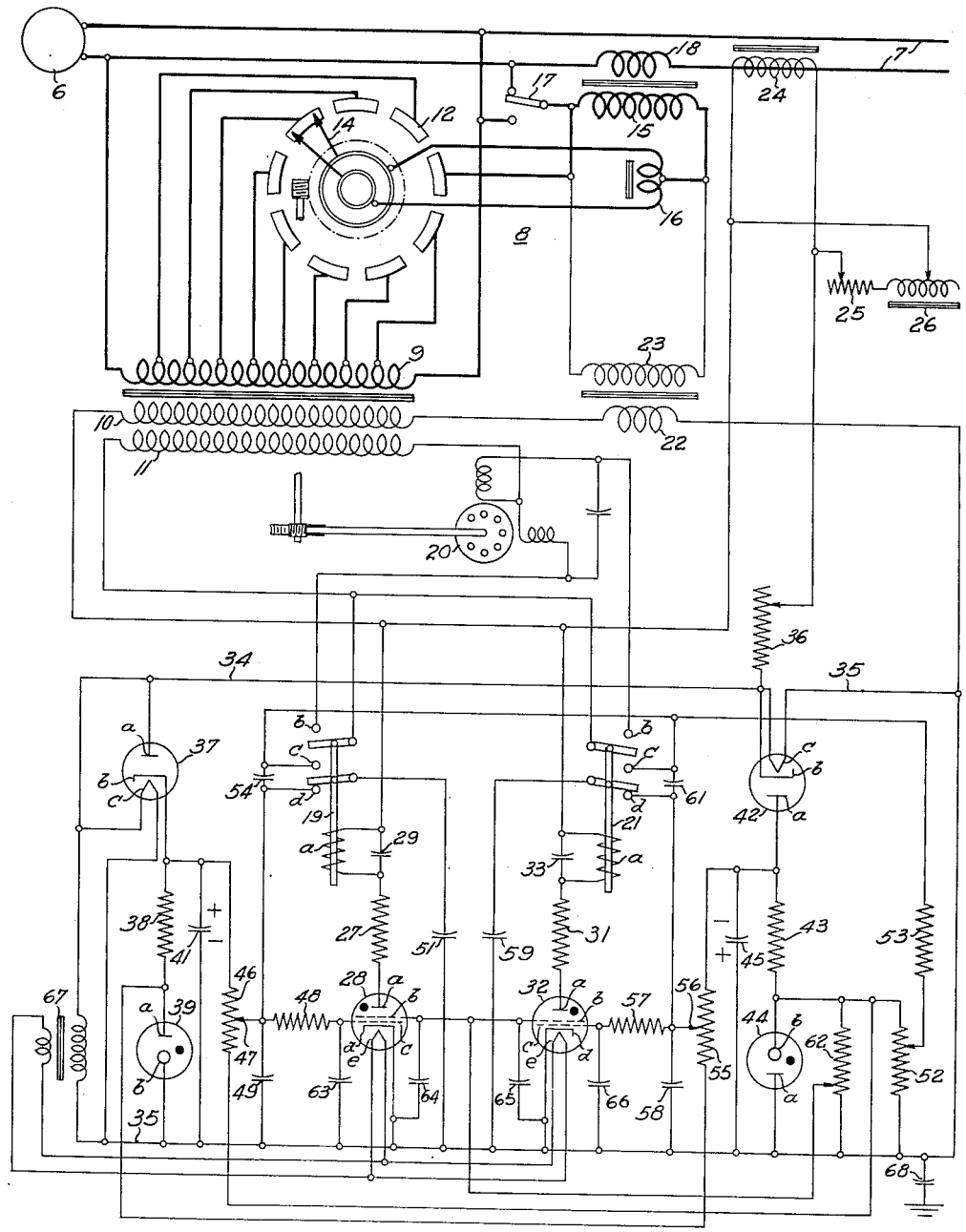

DELAYED VOLTAGE RESPONSIVE SYSTEM UTILIZING CAPACITOR CONTROLLED THYRATRONS

Rudolph M. Serota, Milwaukee, Wis., assignor to Allis-Chalmers Manufacturing Company, Milwaukee, Wis., a corporation of Delaware Application June 20, 1945, Serial No. 600,508

6 Claims. (Cl. 323—43.5)

This invention relates in general to improvements in electric control systems and more particularly to voltage responsive circuits for controlling the operation of translating devices such as voltage indicating means and voltage regulating means.

The operation of translating devices is often controlled by means of a pair of relays which are selectively energized in response to variation of a voltage or of another electrical quantity above and below a predetermined range of values. The relays may be energized through a pair of thyratrons of which one is responsive to variation of the quantity above a predetermined value and the other is responsive to variation of the quantity below another predetermined value.

The grid circuits of the two thyratrons are then generally provided with separate adjusting means. Such means may serve for the coarse adjustment of the operating points of the thyratrons, and it is then advantageous to provide common fine adjustment means in the grid circuits of the thyratrons for simultaneously varying the voltages to which the thyratrons are responsive without substantially changing their difference. In regulating systems in which a regulator is controlled by a voltage responsive system of the type herein considered and in which the response of the thyratrons is delayed by capacitors connected to their grid circuits, it is advantageous to disconnect at least part of a time delay capacitor during operation of the associated thyratron to prevent overtravel of the regulator. The capacitor may then be given a charge for delaying subsequent response of the thyratron beyond the time normally required for such response to thereby prevent excessively frequent operation of the regulator. The delay capacitor may also be used for impressing a transient potential on the thyratron grid upon operation of the thyratron to insure that the thyratron will continue to carry current for a substantial length of time.

It is therefore an object of the present invention to provide a voltage responsive device comprising common means for simultaneously adjusting the response of a pair of thyratrons to different values of voltage.

Another object of the present invention is to provide an electric control system in which time delay means controlling the operation of a regulating device are rendered inoperative during operation of the device.

Another object of the present invention is to provide an electric control system in which time delay means controlling the operation of a regulating device are caused to impart an abnormally long delay to any response of the system immediately following completion of an operation of the device.

Another object of the present invention is to provide a voltage responsive system in which a thyratron energized from a source of alternating current is so controlled as to carry current for periods always exceeding one cycle of the voltage of the source.

Objects and advantages other than those above set forth will be apparent from the following description when read in connection with the accompanying drawing, which diagrammatically illustrates one embodiment of the present invention applied to the control of a feeder voltage regulator of the tap changing type.

Referring more particularly to the drawing by characters of reference, numeral 6 designates an alternating current generator connected with a distribution circuit 7 of which the voltage is to be regulated independently of the generator voltage. This regulation is effected by means of a regulator generally designated by 8. The regulator may be of any suitable known type and may comprise a transformer having a primary winding 9 and secondary windings 10, 11. Winding 9 is connected across circuit 7 and is provided with a plurality of taps severally connected with the fixed contacts 12 of a tap changer. The movable contacts 14 of the tap changer are connected with a regulating winding 15 through a protective autotransformer 16. Winding 15 may be connected with one or the other conductor of circuit 7 through a selector switch 17 to cause the regulator either to buck or boost the voltage of circuit 7. Winding 15 is inductively related with a winding 18 serially connected with circuit 7 to induce therein a voltage depending on the position of contacts 14 and of switch 17. Contacts 14 may be actuated by a reversible capacitor motor 20 through suitable known means (not shown) for insuring that the movable contacts always complete any movement thereof initiated by the motor.

The operation of regulator 8 is controlled by a voltage responsive system comprising a pair of current responsive relays 19, 21 for selectively connecting the stator windings of motor 20 with winding 11 to cause regulator 8 to raise or lower the voltage of circuit 7. Relays 19, 21 may be energized from any suitable source of electric current, and it is generally expedient to supply current to the relays from winding 10 through the secondary winding 22 of a transformer having a primary winding 23 connected across winding 15. The connections of the coil 19a of relay 19 are completed through a current limiting resistor 27 and the plate circuit of a thyratron 28. Coil 19a is shunted by a current smoothing capacitor 29. Coil 21a of relay 21 is likewise connected with winding 22 through a current limiting resistor 31 and the plate circuit of a thyratron 32, and is bridged by a current smoothing capacitor 33.

A variable voltage proportional to the voltage of a predetermined point of circuit 7 is impressed between a pair of conductors 34, 35 from windings 10, 22 through circuit means comprising any suitable known line drop compensator and an adjustable resistor 36. The line drop compensator may comprise, for example, a current transformer 24 energized from circuit 7 and supplying current to an adjustable resistor 25 and an adjustable reactor 26.

The operation of thyratrons 28, 32 is controlled by means comprising a pair of voltage dividers connected in parallel across conductors 34, 35. One of the voltage dividers comprises a rectifying device such as a diode 37 having an anode 37a connected with conductor 34 and a cathode 37b connected with conductor 35 through a resistor 38 and a constant voltage device of any suitable known type such as a battery, a dynamoelectric machine or, preferably, a dissymmetrical glow discharge tube 39. Resistor 38 and tube 39 are bridged by a capacitor 41 for maintaining the potential of cathode 37b at a substantially constant value between successive cycles of the voltage of circuit 7. The other voltage divider comprises a second diode 42 having its cathode 42b connected with conductor 34 and its anode 42a connected with conductor 35 through a second resistor 43 and another constant voltage device such as a second glow discharge tube 44. Resistor 43 and tube 44 are shunted by a capacitor 45 similar to capacitor 41.

The connections for energizing control grids 28c of thyratron 28 comprise means for delaying the response of the thyratron to variations in the voltage of circuit 34, 35 including suitable impedance means such as a resistor 46 connected between cathode 37b and cathode 44b of tube 44. An adjustable intermediate point of resistor 46 is connected with grid 28c through a tap 47 and through a resistor 48, and is connected with conductor 35 through a relatively small delaying capacitor 49 as well as through contact 19d and a relatively large delaying capacitor 51. Capacitor 51 may be disconnected from tap 47 by means of relay 19, which reconnects capacitor 51 through contact 19c and a resistor 53 with an adjustable tap of a resistor 52 connected in parallel with tube 44. Contacts 19c, 19d are bridged by a relatively small capacitor 54.

The connections for energizing control grid 32c likewise comprise a resistor 55 connected between anode 42a of the diode 42 and anode 39a of tube 39. Resistor 55 is provided with an adjustable tap 56 connected with grid 32c through a resistor 57. Tap 56 is connected with conductor 35 through a small delaying capacitor 58 and through contact 21d in series with a large delaying capacitor 59. Relay 21 is operable to disconnect capacitor 59 from tap 56 and to reconnect capacitor 59 with resistor 53 through contact 21c. Contacts 21c, 21d are bridged by a capacitor 61.

The screen grids 28b, 32b of the thyratrons are connected with an adjustable tap of a resistor 62 connected across tube 44. Capacitors 63 to 66 are connected between the grids and the cathodes of the thyratrons to prevent undesired operation of the thyratrons in response to transient voltages which may accidentally appear in grid circuits.

To insure uniform response of the system to the voltage of circuit 34, 35 the filaments of the diodes and of the thyratrons are energized from the latter circuit in any suitable known manner. Filaments 28e, 32e may be connected with circuit 34, 35 through a suitable transformer 67. Filaments 37c, 42c may be likewise energized from a filament transformer or may be connected across circuit 34, 35 if they are designed for the voltage of the circuit. If diodes 37, 42 are disposed in a common envelope they may be provided with a common filament likewise connected between conductors 34 and 35.

It will be apparent that each tapped resistor of the system may comprise an untapped portion connected in series with a tapped portion to improve the accuracy of the adjustments that may be obtained therewith. One of the conductors of the system, conductor 35 for example, may be grounded to the frame supporting the elements of the system either conductively or through a capacitor 68 for preventing the appearance of disturbing alternating voltage components between the circuits of the system and the frame.

The range of voltage response of the system and the time of response of the thyratrons may be varied in any desired manner by varying the elements of the system. It has been found that the system operated satisfactorily to regulate the voltage of an actual distribution circuit by energizing circuit 34, 35 at 115 volts when the voltage of distribution circuit has the desired value and building the system of elements identified by the following engineering data:

| | |
|---|---|
| Thyratrons 28, 32 | Type 2050 |
| Diodes 37, 42 | Type 117Z6 |
| Glow tubes 39, 44 | Type VR 105/30 |
| Resistor 36 | 200 ohms |
| Resistors 27, 31 | 2,500 ohms |
| Resistor 43 | 5,000 ohms |
| Resistor 38 | 7,500 ohms |
| Resistor 53 | 100,000 ohms |
| Resistor 52 | 550,000 ohms |
| Resistors 46, 55 | 1 megohm |
| Resistor 62 | 1.5 megohm |
| Resistors 48, 57 | 2 megohms |
| Capacitors 63, 64, 65, 66 | 0.002 microfarad |
| Capacitor 68 | 0.1 microfarad |
| Capacitors 54, 61 | 0.25 microfarad |
| Capacitors 49, 58 | 1 microfarad |
| Capacitors 41, 45 | 2 microfarads |
| Capacitors 54, 61 | 4 microfarads |
| Capacitors 51, 59 | 25 microfarads |

The operation of the system will first be considered assuming that the voltage at the point of circuit 7 corresponding to the adjustment of the line drop compensator is within the desired range of values for which the system is adjusted. The voltage of winding 10 being proportional to the voltage of generator 6 and the voltage of winding 22 being proportional to the regulating voltage supplied to circuit 7 from regulator 8, the voltage impressed on the plate circuits of the thyratrons is proportional to the regulated voltage at the terminals of regulator 8. Under such conditions the thyratrons are maintained in operative by the potentials impressed on the control grids thereof. Current is, however, supplied to the voltage dividers from windings 10, 22 through the line drop compensator, resistor 36 and circuit 34, 35. As the load across circuit 34, 35 is constant, the voltage thereof is also constant and has a predetermined value depending upon the adjustment of resistor 36.

During the positive half cycles of the voltage of circuit 7, diode 37 supplies charging current to capacitor 41 and also supplies current to resistor 38 and tube 39. During the negative half cycles, the flow of current through tube 39 is supplied from capacitor 41, which has a sufficient capacity to maintain the potential of cathode 37b substantially constant from one cycle to the next. The potential of cathode 37b however is able to follow the variations of the voltage of circuit 34, 35 in response to variations in the voltage of circuit 7 over periods including a relatively large number of cycles. Cathode 37b may thus be considered to constitute a source of variable positive potential for grid 28c. As the voltage drop in tube 39 remains substantially constant when the current through the tube varies within wide limits, anode 39a may be considered to constitute a source of constant positive potential for grid 32c.

Likewise anode 42a constitutes a source of variable negative potential for grid 32c and cathode 44b constitutes a source of constant negative potential for grid 28c.

The potential of tap 47 and of grid 28c is intermediate the positive and negative potentials impressed on the terminals of resistor 46 from the voltage dividers, and the potential of tap 56 and of grid 32c is intermediate the positive and negative potentials impressed on the terminals of resistor 55 from the voltage dividers. The taps of resistors 36, 46, 55 and 62 are so adjusted that when the voltage of circuit 7 is within the desired range of values the potentials of grids 28c, 32c are slightly below the critical potential of the thyratrons so that the thyratrons remain nonconductive. This critical potential is negative with respect to cathode potential in the type of thyratron above identified. Capacitors 54, 61 are charged under a voltage which is slightly less than the voltage appearing between conductor 35 and the tap of resistor 52.

As a result of the above described connections, when the voltage of circuit 7 departs from the desired range, the potential of one of the control grids is raised and the potential of the other control grid is lowered. When the voltage of circuit 7 rises, the potential of cathode 37b impressed on the positive terminal of resistor 46 rises to a corresponding extent. The negative potential impressed from cathode 44b on the negative terminal of resistor 46, however, remains unchanged. The potential of tap 47 and of grid 28c thus rises and will eventually reach the critical potential when the voltage of circuit 7 remains for a sufficient length of time above a predetermined value, which value is determined by the adjustment of the taps of resistors 36, 46 and 62. The rise of the potential of grid 28c is delayed by capacitors 49, 51 which draw charging current causing a transient voltage to appear in resistor 46 and temporarily offset the rise in the potential of cathode 37b. The delay in the rise of the potential of grid 28c to the critical value is relatively large when the increase in the voltage of circuit 7 is relatively small and the delay is relatively small when the increase in the voltage of circuit 7 is relatively large.

When grid 28c reaches the critical potential, thyratron 28 carries current during every other half cycle of the voltage of circuit 7. The thyratron current flows through coil 19a wherein it is rendered sufficiently uniform by the action of capacitor 29 to cause relay 19 to operate and remain in the operated condition as long as the thyratron carries current. Relay 19 closes contact 19b, thereby energizing motor 20, and the motor actuates regulator 8 to the proper position for restoring the voltage of circuit 7 to the desired value.

Relay 19 also disconnects capacitor 51 from tap 47 and from one of the terminals of capacitor 54 and reconnects capacitor 51 with the other terminal of capacitor 54 through contact 19c. A transient positive potential component is thereby impressed on tap 47, the initial value of this potential component being the voltage to which capacitor 54 was previously charged from resistor 52. The transient potential component decays as a result of the gradual charge of capacitor 51 from resistor 52. The elements of the system connected with capacitor 51 are so chosen that the transient potential component maintains grid 28c above critical potential during a period of several cycles even if the voltage of circuit 34, 35 decreases to an extent sufficient to return the grid potential below the critical value. Relay 19 is thus prevented from operating intermittently in response to a rapid succession of intermittent increases of the voltage of circuit 7 above the value for which operation of thyratron 28 is desired.

While thyratron 28 is conducting current the potential of grid 28c never rises above cathode potential. The grid therefore carries an ionic current which charges capacitors 63 and 49. The capacitance of capacitor 63 however is so small that the charge of the capacitor is completely dissipated through resistors 48 and 46 during the nonconducting half-cycle periods of thyratron 28. Resistor 48 has a resistance of such high value that the charge of capacitor 49 due to the ionic current is likewise negligible and is also dissipated during the nonconducting half-cycle periods of thyratron 28.

During operation of regulator 8, capacitor 51 is connected across a portion of resistor 52 through contacts 19c, resistor 53 and conductor 35. The capacitor is then gradually charged at a predetermined portion of the voltage drop in tube 44, whereby the capacitor charge is given a relatively large negative increment and the capacitor terminal connected with contact 19c is brought to a substantial negative potential. When the voltage of circuit 7 has been returned to substantially the desired value as a result of the operation of regulator 8, the voltage of circuit 34, 35 is likewise returned to substantially its normal value. The potential of grid 28c is returned below the critical value with a delay determined by the capacitance of capacitor 49, capacitor 51 then having substantially no delaying action as a result of the connection thereof in series with small capacitor 54. The delay produced by capacitor 49 is small compared to the time required by regulator 8 to move by one step and serves merely to render thyratron 28 unresponsive to momentary decreases in the voltage of circuit 7.

When grid 28c has been returned to a potential below the critical potential, thyratron 28 ceases to carry current and relay 19 returns to the deenergized position shown. Contact 19b opens and deenergizes motor 20, which stops and holds regulator 8 in the position reached thereby. Contact 19d recloses to reconnect capacitor 51 with tap 47. The voltage to which capacitor 51 was charged from resistor 52 then depresses the potential of grid 28c below the value corresponding to the actual voltage of circuit 7. This depression of the potential of grid 28c is gradually removed while capacitor 51 gradually discharges through resistor 46. Grid 28c thus gradually returns to a potential corresponding to the actual voltage of circuit 7 with a relatively large time delay, whereby regulator 8 is prevented from operating at excessively frequent intervals even if the voltage of circuit 7 fluctuates rapidly about the desired value.

When the voltage of circuit 7 decreases below a predetermined value depending on the adjustment of resistors 36, 55 and 62, negative potential impressed from anode 42a on one of the terminals of resistor 55 becomes less while the positive potential impressed from anode 39a on the other terminal of resistor 55 remains unchanged. The potential of tap 56 and of grid 32c therefore rises and, if the voltage of circuit 7 remains below the predetermined value for a sufficient length of time, grid 32c reaches the critical potential of thyratron 32. Current is then supplied to coil 21a through thyratron 32 in the manner above described with respect to coil 19a, and motor 20 is caused to drive regulator 8 in the proper direction for raising the voltage of circuit 7. The operation of thyratron 32 is then the exact counterpart of the operation of thyratron 28 resulting from a rise in the voltage of circuit 7 and therefore is not described in detail.

The values of the voltage of circuit 7 at which thyratrons 28 and 32 operate may be adjusted by means of taps 47, 56, which may be used as coarse adjustments of the voltages. A fine adjustment of both voltages in the same sense may be obtained by adjusting the tap of resistor 36. The latter adjustment does not change the value of the voltages of circuit 34, 35 at which the thyratrons operate but varies the ratio between the voltage of circuit 34, 35 and the voltage of circuit 7.

The voltages of circuit 7 at which thyratrons 28, 32 operate may be varied in opposite senses by adjusting the tap of resistor 62. The latter adjustment varies the potential of screen grids 28b, 32b, thereby causing the critical potential of grids 28c, 32c to vary to a corresponding extent. The voltage range within which the voltage of circuit 7 may vary without causing operation of regulator 8 may thus be adjusted while leaving the average value of the voltage unchanged.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. In a voltage responsive system comprising circuit means for supplying a variable voltage and a current responsive device, the combination of a thyratron having an anode, a cathode and a control grid, said anode being connected to said current responsive device, means for energizing said control grid comprising impedance means connecting said control grid with said circuit means for rendering said thyratron conductive in response to variation of said voltage through an adjustable predetermined value, means for delaying the response of said thyratron comprising a capacitor connected between said impedance means and said cathode, and means comprising an element of said device, the last said means being responsive to energization of said current responsive device for disconnecting said capacitor from said impedance means to prevent delay in the response of said thyratron and for modifying the charge of said capacitor and responsive to deenergization of said current responsive device for reconnecting said capacitor with said impedance means to restore the delay in the response of said thyratron to said variation of said voltage.

2. In a voltage responsive system comprising circuit means for supplying a variable voltage and a current responsive device, the combination of a thyratron having an anode, a cathode and a control grid for controlling said device, means for energizing said control grid comprising impedance means connecting said control grid with said circuit means for rendering said thyratron conductive in response to variation of said voltage through an adjustable predetermined value, means for delaying the response of said thyratron comprising a capacitor connected between said impedance means and said cathode, and means comprising an element of said device, the last said means being responsive to energization of said current responsive device for disconnecting said capacitor from said impedance means to prevent delay in the response of said thyratron and for giving a negative increment to the charge of said capacitor and responsive to deenergization of said current responsive device for reconnecting said capacitor with said impedance means to restore the delay in the response of said thyratron to said variation of said voltage.

3. In a voltage responsive system comprising circuit means for supplying a variable alternating voltage a current responsive device, the combination of a thyratron having an anode, a cathode and a control grid, for controlling said device, means for energizing said control grid comprising impedance means connecting said control grid with said circuit means for rendering said thyratron conductive in response to variation of said voltage through an adjustable predetermined value, and means comprising an element of said device, the last said means being responsive to operation of said current responsive device for impressing a transient positive potential component on said control grid to maintain said control grid at a positive potential for at least one complete cycle of said variable voltage.

4. In a voltage responsive system comprising circuit means for supplying a variable voltage and a current responsive device, the combination of a thyratron having an anode, a cathode and a control grid, for controlling said device, means for energizing said control grid comprising impedance means connecting said control grid with said circuit means for rendering said thyratron conductive in response to variation of said voltage through an adjustable predetermined value, means for delaying the response of said thyratron comprising a capacitor connected between said impedance means and said cathode, a source of negative potential, a resistor and a second capacitor serially connected between said cathode and said impedance means, means comprising an element of said device, the last said means being responsive to energization of said current responsive device for switching the connection of the first said capacitor from the said impedance means to the juncture point of said second capacitor and said resistor to impress a transient positive potential component on said control grid to prevent delay in the response of said thyratron, and means comprising said element of said device, the last said means being responsive to deenergization of said current responsive device for reconnecting the first said capacitor with said impedance means to restore the delay in the response of said thyratron to said variation of said voltage.

5. In a voltage responsive system comprising circuit means for supplying a variable voltage and first and second current responsive devices, the combination of a first thyratron for controlling said first current responsive device, a first adjustable connection between the control grid of said first thyratron and said circuit means for rendering said first thyratron conductive in response to variation of said voltage above a first predetermined adjustable value, first impedance means connected with said first thyratron for delaying the response of said first thyratron to said voltage variations above said first predetermined adjustable value, first switch means connected with said first impedance means responsive to operation of said first current responsive device for rendering inoperative said first impedance means, a second thyratron for controlling said second current responsive device, a second adjustable connection between the control grid of said second thyratron and said circuit means for rendering said second thyratron conductive in response to variation of said voltage below a second predetermined adjustable value, second impedance means connected with said second thyratron for delaying the response of said second thyratron to said voltage variations below said second predetermined adjustable value, second switch means connected with said second impedance means responsive to operation of said second current responsive device for rendering inoperative said second impedance means, and common adjustable means in said adjustable connections for simultaneously adjusting said first and second voltage values.

6. In a voltage responsive system comprising circuit means for supplying a variable voltage and first and second current responsive devices, the combination of a first thyratron for controlling said first current responsive device, a first adjustable connection between the control grid of said first thyratron and said circuit means for rendering said first thyratron conductive in response to variation of said voltage above a first predetermined adjustable value, first means for delaying the response of said first thyratron to said voltage variations above said first predetermined adjustable value, first means responsive to operation of said first current responsive device for rendering inoperative said first response delaying means, a second thyratron for controlling said second current responsive device, a second adjustable connection between the control grid of said second thyratron and said circuit means for rendering said second thyratron conductive in response to variation of said voltage below a second predetermined adjustable value, second means for delaying the response of said second thyratron to said voltage variations below said second predetermined adjustable value, means responsive to operation of said second current responsive device for rendering inoperative said second response delaying means, and common adjustable means in said adjustable connections operable for simultaneously varying said first and second voltage values in the same sense.

RUDOLPH M. SEROTA.

REFERENCES CITED

The following references are of record in the file of this patent:

UNITED STATES PATENTS

| Number | Name | Date |
| --- | --- | --- |
| 1,959,298 | Levy et al. | May 15, 1934 |
| 2,023,084 | Kovalsky | Dec. 3, 1935 |
| 2,302,889 | Reed | Nov. 24, 1942 |
| 2,368,582 | Sziklai | Jan. 30, 1945 |
| 2,387,444 | Hayslett et al. | Oct. 23, 1945 |
| 2,431,284 | Stadum | Nov. 18, 1947 |

Certificate of Correction

Patent No. 2,516,348                                             July 25, 1950

RUDOLPH M. SEROTA

It is hereby certified that error appears in the printed specification of the above numbered patent requiring correction as follows:

Column 8, line 44, after the word "voltage" insert *and*; lines 46 and 64, after "grid" strike out the comma;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*